United States Patent [19]

Kautto

[11] Patent Number: 4,882,852
[45] Date of Patent: Nov. 28, 1989

[54] PROCEDURE AND MEANS FOR DRYING MOVING WEB MATERIAL

[75] Inventor: Jorma Kautto, Järvenpää, Finland

[73] Assignee: Imatran Voima Oy, Finland

[21] Appl. No.: 199,262

[22] PCT Filed: Oct. 26, 1987

[86] PCT No.: PCT/FI87/00140
§ 371 Date: May 25, 1988
§ 102(e) Date: May 25, 1988

[87] PCT Pub. No.: WO88/03193
PCT Pub. Date: May 5, 1988

[30] Foreign Application Priority Data

Oct. 31, 1986 [FI] Finland .................................. 864449

[51] Int. Cl.$^4$ .................................................. F26B 3/32
[52] U.S. Cl. ............................................... 34/41; 34/68
[58] Field of Search ................... 34/4, 39, 41, 152, 60, 34/68, 18

[56] References Cited

U.S. PATENT DOCUMENTS

| | | | |
|---|---|---|---|
| 3,499,232 | 3/1970 | Zimmermann | 34/68 |
| 3,972,127 | 8/1976 | Hoshi et al. | 34/4 |
| 4,202,112 | 5/1980 | von der Eltz et al. | 34/4 |
| 4,513,516 | 4/1985 | Bjornberg | 34/41 |
| 4,565,917 | 1/1986 | Furtek | 219/388 |
| 4,594,795 | 6/1986 | Stephanson | 34/68 |

Primary Examiner—Henry A. Bennet
Attorney, Agent, or Firm—Steinberg & Raskin

[57] ABSTRACT

The invention concerns a procedure for drying a moving web material (E), wherein on the material (E) to be dried is directed infrared radiation, and wherein the moving web material is transported through the radiation zone of an infrared radiator, the web material to be dried absorbing radiation. On the moving web material to be dried is directed the radiation produced by at least one first infrared radiator ($T_1$) and the radiation produced by at least one second infrared radiator ($T_2$), the radiators being disposed close to each other, the maximum intensity wavelength ($\lambda_{maximum}$) ($T_1$) of the radiation from the first infrared radiator ($T_1$) being smaller than the maximum intensity wavelength ($\lambda_{maximum}$) ($T_2$) of the radiation from the second radiator ($T_2$), whereby in the drying process the spectrum of the total radiation is maximally advantageous in relation to the absorption spectrum of the material to be dried. The invention also concerns an IR dryer.

18 Claims, 9 Drawing Sheets

Fig. 8B $$I_A(\lambda) = I(\lambda) - I_H(\lambda) - I_T(\lambda)$$

PROCEDURE AND MEANS FOR DRYING MOVING WEB MATERIAL

BACKGROUND OF THE INVENTION

The present invention concerns a procedure for drying moving web material, in which on the material to be dried infrared radiation is directed and in which the moving web material is transported through the radiation zone of an infrared radiator, where the web material to be dried absorbs radiation.

The invention also concerns an IR dryer.

In paper and pulp industry, and in other branches of industry as well, moving web material is dried. Paper manufacturing and paper conversion include a number of steps in which it is necessary to accomplish drying by a non-contact method, that is using appropriate radiation and/or hot gases or air.

Existing types of infrared radiation apparatus used in drying web material consist of high-temperature quartz tube radiators or gas-operated medium wavelength radiators. The wavelength range of high-temperature short wave radiators is mainly 0.5 to 2 $\mu$m, with peak at about 1.2 $\mu$m. Shortwave radiation is penetrating when drying a thin web, because the coefficient of absorption of the material is poor as a rule in the wavelength range between 0.5 and 2.0 $\mu$m, peak absorption usually occurring in the range above 3.0 $\mu$m. As a consequence, the emission peak of the radiator and the absorption peak of the material do not coincide. However, high power per unit area is achieved with a high-temperature short wave radiator. The total power may be up to 450 kW/m$^2$, in which case the radiant power absorbed in the web is more than 100 kW/m$^2$. Power outputs of the magnitude are required when rapid drying is aimed at; this, in its turn, is required e.g. in the paper coating process. Short wave infrared radiators have also been employed under zone control in order to control the moisture profile of paper web material in the direction across the web.

The wavelength range of medium long wave infrared radiators is mainly 1.5 $\mu$m to 6 $\mu$m. The wavelength corresponding to maximum intensity is located at about 3.0 $\mu$m. The same point is also usually one of the absorption points of the water constituting the object to be evaporated. At this point the cellulose fibres also display good absorptivity. Owing to the circumstances mentioned, the radiation efficiency of the radiation from a medium long wave radiator is high, about 45%, while this figure is about 25-30% for short wave infrared radiation apparatus, or for a high-temperature radiator, in cases in which thin web materials are being dried. The efficiency of both types of radiator increases with increasing material thickness.

The maximum radiation power achievable with medium wave infrared radiators is 60-75 kW/m$^2$ when using a unilateral radiation source and 120-150 kW/m$^2$ when using a radiation source on both sides.

The dryer built up with an infrared radiation means, or the IR dryer, is composed of a radiant surface which is located as close as possible to the surface to be dried. In apparatus of prior art, the radiant surface is encapsulated in a housing and the housing is installed, fixedly or provided with a motion mechanism, at a suitable location, attached to the frame structure of the process equipment. In said dryers the use of a counter-reflector is further known which throws back the radiation that has passed through the object being dried and thereby enhances the drying process. Furthermore, prior art knows air-conditioning systems employed in association with IR dryers, which serve the purpose of enhancing the drying and, at the same time, serve as coolers. The IR dryer may moreover comprise a system by which the drying power of the apparatus can be controlled.

Numerous different IR dryers used to dry a moving web, or a web material, are known in the art. Their operation is based on the ability of bodies to emit electromagnetic radiation, which is characteristic of the temperature which the body has. Another characteristic feature of the radiation is that, instead of one single wavelength, the radiator emits a plurality of wavelengths, whereby the characteristic emission spectrum of the particular radiator is created. Furthermore, according to the laws of physics, it is a characteristic feature of the radiation that when the temperature of the radiant body becomes higher, the radiant heat transfer to the target material increases in proportion to the fourth power of the differential temperature between the bodies.

However, the temperature of the radiator is not the exclusive factor determining how much radiation can be caused to be absorbed in the material that is being dried. The coefficient of absorption, which states the proportion of the radiation incident on the surface of the body that is absorbed by the material, is determined by the temperature, moisture content, thickness, material, surface roughness and lightness of colour of the body that is being dried. As a rule, however, the coefficient of absorption is a function of the wavelength in that in the short wave range the coefficient of absorption of a thin material is poorer than in the medium or long wave length.

On the basis of their maximum intensity wavelength, radiators are divided into short, medium and long wavelength radiators, the last-mentioned being rarely applied in technical processes. As IR radiation sources operating in the short wave infrared range those radiaters are counted which emit radiation having its maximum intensity wavelength in the wavelength range from 0.76 to 2.00 $\mu$m. As IR radiation sources operating in the medium infrared range those radiaters are counted which emit radiation having its maximum intensity wavelength in the wavelength range from 2.00 to 4.00 $\mu$m.

The temperature relationship is found with the aid of the Wien shift, from the formula:

$$\lambda_{max} \times T = 2.8978.10^{-3} (mK)$$

The temperature range for a short wave radiator is found to be 3540° C. to 1176° C. and that for a medium wave radiator, 1176° C. to 450° C.

IR dryers operating in the short wave range are nowadays almost exclusively electrically driven. In them a tungsten wire, usually placed within a quartz tube, is made incandescent with the aid of electric current. In order to counteract oxidation, the tube is filled with an inert or halogen gas. The filament temperature is usually about 2200° C., whereby the wavelength corresponding to maximum radiation intensity is about 1.2 $\mu$m. However, the surface structure of the lamp cannot tolerate temperatures in excess of 300° C., for which reason the lamps have to be cooled by blowing cool air past between the lamps. The air is discharged through holes in the radiant surface into the drying zone. As it passes through between the hot lamps, the air is heated several ten degrees Centigrade, and when discharging into the drying zone this air possesses a fairly high drying potential, which is understood to mean low relative humidity and high temperature, compared with the state of the boundary layer of saturated air on the surface of the body.

In short wave infrared radiators of the prior art, the lamps are usually configured in modules of 3 to 10 lamps each. These modules are mounted side by side, and thereby a drying zone extending all the way across the web is obtained. The density, or spacing, of the lamps is usually such that the power per unit area in the dryer varies between 100 and 450 kW/m².

Dryers operating in the medium wavelength IR range are either electrically or gas-powered. In electrical apparatus, coiled Kanthal wire is made incandescent with the aid of electric current, either in a quartz tube or behind a ceramic brick. In the first instance the coiled wire serves directly as emitter, while in the second case the heat is first conductively transferred to the brick, whereafter the brick constitutes the emitter. In gas-driven systems a radiator, usually ceramic, is made incandescent with the aid of a flame, whereby the radiator becomes incandescent and then serves as emitter. Radiation is in part also emitted directly by the flame. As has been observed before, the maximum intensity wavelength of medium wave infras is 2.00–4.00 $\mu$m, the corresponding radiator temperature being, as also has been observed, 1176°C. to 450° C. There is usually no need to cool the apparatus, nut whenever higher power density is aimed at, or when it is desired to enhance the ventilation and evaporation, the equipment is provided with ventilation systems. The maximum power density of medium wave infrared radiators varies, depending on method and temperature, between 40 and 100 kW/m².

The drawbacks of short wave infraradiators include poor radiation efficiency in the wavelength range of the radiator, low overall efficiency, inefficient use of the cooling air towards drying, an expensive electrical control system, high operating costs, and fire hazard owing to high temperature.

The drawbacks of medium infraradiators include fairly low power per unit area whenever fast drying is aimed at, in the case of electric infras rather high operating costs, poor controllability, rather slow warming-up and after-glow, high fire hazard, explosion risk owing to gas handling, and inefficiency of the cooling air that is used, in view of the drying event proper.

Thus the significant deficiency of all existing infrared dryers, or IR dryers, made up of infrared radiators may be considered, when the dryer consists of short wave radiators, to be the inadequate efficiency of short wave radiators, resulting from the low coefficient of absorption in the radiator's wavelength range of the material to be dried. When the IR dryer consists of medium wave infrared radiators, one may name as a particular deficiency their inadequate controllability, owing to the prolonged afterglow of medium wave radiators. In addition, medium wave radiators yield only low rates of power per unit area.

SUMMARY OF THE INVENTION

One object of the present invention is to provide a procedure and means in which the emission spectrum of the IR radiator can be devised to be advantageous in view of the material that is being dried. The high power per unit area and high absorption efficiency of the radiation required by fast drying are attained. The object of the invention is specifically a procedure and a means in which the emission spectrum of the IR radiator is consistent with the absorption spectrum of the material that is being dried and so that the emission and absorption peaks of said spectra fall rather closely into the same wavelength range.

One object of the invention is also a procedure and means in which the cooling air of the means can be efficiently utilized in the drying process.

The procedure of the invention is mainly characterized in that on the moving web material that is being dried is directed the radiation produced by at least one first infrared radiator ($T_1$) and the radiation produced by at least one second infrared radiator ($T_2$), these radiators being disposed close to each other, and the maximum intensity wavelength ($\lambda_{maximum}$) of said first infrared radiator ($T_1$) being smaller than the maximum intensity wavelength of said second radiator ($T_2$), whereby in the drying event the spectrum of the total radiation is maximally advantageous regarding the absorption spectrum of the material that is being dried.

The means of the invention is mainly characterized in that the infrared dryer comprises at least one first infrared radiator and at least one second infrared radiator which have been disposed close to each other, and the maximum intensity wavelength of the radiation of said first infrared radiator being smaller than the maximum intensity wavelength of the radiation from said second radiator.

In the procedure and with the means of the invention the emission spectrum sent out by the means will be advantageous regarding the material to be dried. In the procedure of the invention two different type radiators are used in parallel. One radiator is advantageously a short wave radiator which has a maximum intensity wavelength smaller than that of the second radiator, which advantageously is a medium wave radiator. In the procedure of the invention the short wave radiator with smaller maximum intensity wavelength is disposed to be located before the radiator having a greater maximum intensity wavelength, as seen in the direction of travel of the material to be dried. Said radiators, advantageously short and medium wave radiators are in the procedure and IR dryer of the invention grouped in specific zones of their own. They are, in one embodiment of the invention, disposed consecutively on one side of the web material to be dried, and in another advantageous embodiment of the invention said dryers are disposed on different sides of the web to be dried, and advantageously opposed in relation to each other. In a third advantageous embodiment of the invention the short and medium wave radiators are disposed in one and the same zone so that they alternate in one and the same plane of radiation.

By the teachings of the present invention a spectrum of the radiator has been achieved which is advantageous in view of the drying process. With the dryer of the invention a radiation efficiency is attained which is at least 5% better than that obtainable with any apparatus design conforming to the state of art.

In the invention, the strong points of the short wave radiator and of the medium wave radiator have been successfully utilized, and with this combination, an IR dryer has been obtained which presents high power per unit area, rapid starting and extinction, fast control, small size, easy installation, simple structure and good radiation efficiency. The operating costs of the means of the invention are lower, and the investments smaller than in any apparatus designs conforming to the state of art.

Referring to the operating costs of a typical 1000 kW infrared radiator, the improved efficiency of the invention affords savings in the approximate amount of FIM 60'000 per year. The investments, too, are on the same order of magnitude as those of a short wave infra, or lower; therefore, the dryer of the invention is more advantageous in total expenditure than any apparatus design conforming to the state of art.

As taught by the invention, the radiators are so configurated in relation to the web material to be dried and to its direction of travel that the material is rapidly heated in a short wave zone as it enters the dryer, this zone also starting powerful evaporation, owing to the high power per unit area of short wave infrared radiation. From the short wave zone, the web material transfers to the high-efficiency medium wave zone, which carries on the drying of the web material.

The ultimate moisture content of the web material, e.g. of paper, is attained after the radiation dryer, most usually with the aid of drying cylinders.

The procedure and means of the invention are particularly of importance in the drying of coatings. The absorption of the water present in the coating compound into the base paper can be rapidly arrested. This causes the bonding agent migration to cease, and the compound will rapidly reach its gelification point.

BRIEF DESCRIPTION OF THE DRAWINGS

The invention is described in the following in greater detail, referring to some advantageous embodiments of the invention, presented in the figures of the attached drawings, yet to which the invention is not meant to be exclusively confined.

DESCRIPTION OF THE PREFERRED EMBODIMENTS

Figure 1:
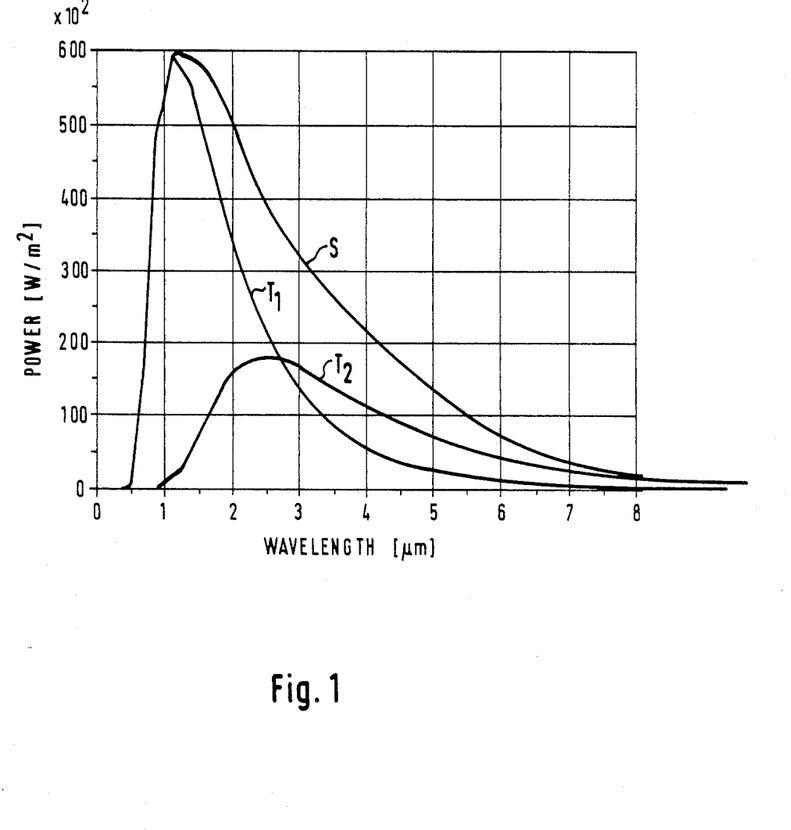
In FIG. 1 are presented emission spectra of a short wave infrared radiator and of a medium wave infrared radiator.

In FIG. 1 are presented the emission spectra of two different radiators. The radiant power, in watts per square meter, has been plotted as vertical coordinate and the wavelength $\lambda$, in micrometres, as horizontal coordinate. $T_1$ represents an infrared radiator of which the maximum radiation intensity lies within the range of short wave radiation, i.e., in the interval from 0.76 to 2.00 $\mu$m. It is thus understood that a so-called short wave infra, or short wave infrared radiator, has been presented. The reference $T_2$ indicates the spectrum of an infrared radiator having its maximum intensity in the range from 2.00 to 4.00 $\mu$m, that is, in the medium wave infrared radiation range. Thus, a medium wave infrared radiator is concerned. It can be seen that the short wave infra has a radiation output rather much superior to the medium wave infra. The short wave radiation of the short wave infra is penetrating, and with diminishing wavelength an increasingly greater part of the radiation will pass through the web material without being absorbed therein. Therefore the average coefficient of absorption of the web decreases with decreasing temperature. The radiation emitted by the radiators has a distribution approximately resembling the radiation from a black body, which has a continuous emission spectrum. The difference between the radiations of a true black body and a so-called grey body can be approximated with the aid of the coefficient of absorption.

$$T_{grey} = \epsilon \times T_{black}$$

where $\epsilon$ is 0.0 to 1.0. For a black body, $\epsilon=1.0$ and for a body emitting no radiation whatever, $\epsilon=0$.

Figure 2A:
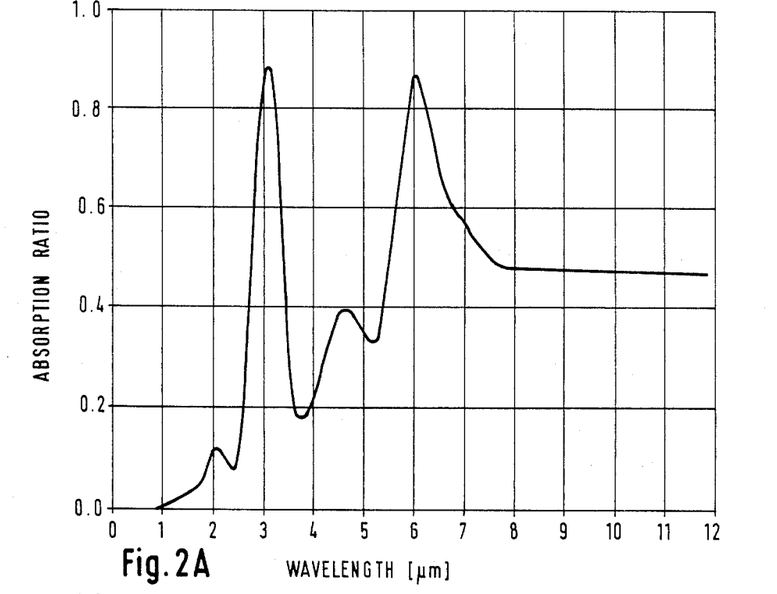
In FIG. 2A is shown the absorption spectrum of water and in FIG. 2B, that of cellulose fibre.

In FIG. 2A is shown the absorption of infrared radiation in water at a water film 0.01 mm in thickness. The wavelength, in micrometres, is plotted on the horizontal axis and on the vertical axis, the absorption ratio, that is the fraction of the radiation which is absorbed by the material.

Figure 2B:
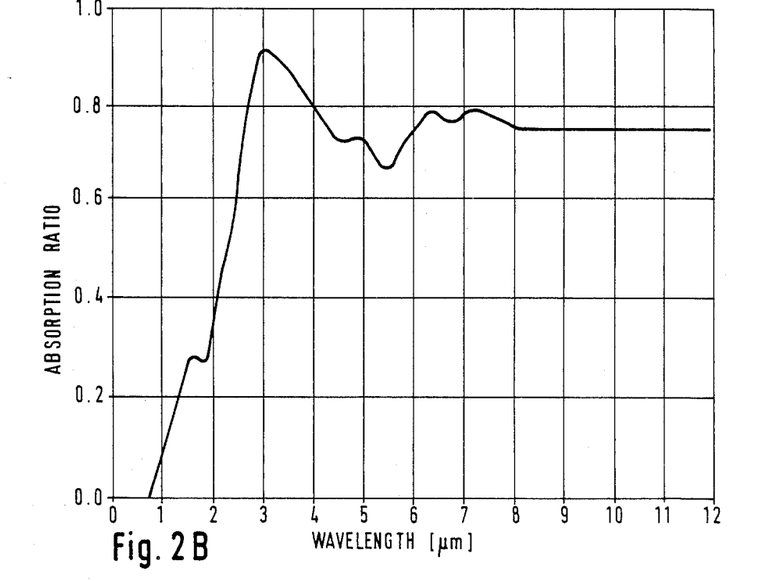

In FIG. 2B is shown the absorption in a layer of cellulose fibres having 0.01 mm thickness.

It is seen from FIGS. 1,2A and 2B that at the absorption maxima of water and of cellulose fibre the spectral intensity of the short wave infra is poorer than that of the medium wave radiator, in spite of the former's high temperature, and the average absorbed power per unit area is higher than in the case of the short wave infra.

When a short and medium wave infra are combined in one radiator, the average radiation spectrum is approximately found by adding together the graphs of FIG. 1. The total spectrum obtained in the procedure of the invention is indicated with S in FIG. 1. Comparison of the new graph obtained in this way and the absorption spectra of water and paper reveals that the new emission curve is more advantageous from the viewpoint of drying than the spectra of any traditional and previously known IR dryer means.

The dryer of the invention produces a total radiation spectrum in which the radiant power has been substantially raised in those wavelength ranges in which the absorption ratio of the web material to be dried is best. It has been understood in the invention that the shape of the total spectrum S of an IR dryer should be consistent with the radiation absorption ratio/wavelength graph of the web material to be dried, and this advantageously in such manner that the point and/or points of maximum radiant power of the radiator's total spectrum graph or the radiant power maximum ranges coincide with the maximum and/or maxima and/or maximum ranges of the characteristic absorption ratio graph of the absorbing material. It is possible in this way to increase substantially the efficiency of the IR dryer.

Figure 3:
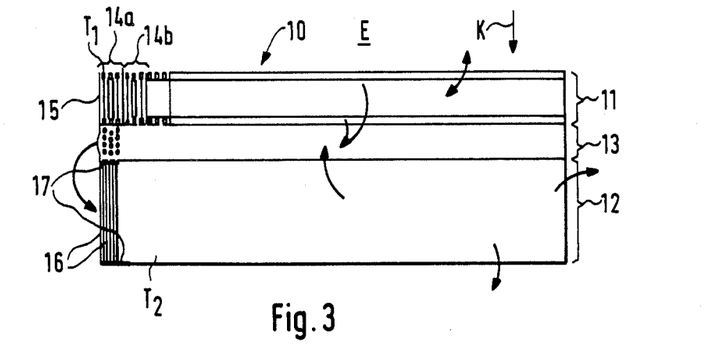
In FIG. 3 is presented the radiation surface of the invention when quartz tube radiators modularly disposed in the structure serve as short wave infrared radiators $T_1$ and medium wave quartz tube radiators serve as medium wave infrared radiators $T_2$.

In FIG. 3 is depicted an IR dryer according to the invention, in top view and viewed in a direction at right angles against the plane in which the material web travels. The radiation zones, or radiation planes, of the dryer have been visualized. The IR dryer 10 comprises at least one first infrared radiator $T_1$ and at least one second infrared radiator $T_2$. Of these, the first radiator $T_1$ has its maximum intensity in a substantially lower wavelength range than the second radiator $T_2$. The maximum intensity of the radiator $T_1$ is also substantially higher than that of the radiator $T_2$. In the embodiment of FIG. 3, and in the rest of the embodiments presented here, the first radiator $T_1$ is most advantageously a short wave infrared radiator, while the second radiator $T_2$ is most advantageously a medium wave infrared radiator. The IR dryer of the invention consists essentially of two different radiation zones. The first radiator $T_1$ is active in the first radiation zone 11, and the second radiator $T_2$ is active in the second radiation zone 12. Most advantageously, the IR dryer 10 of the invention further comprises at least one suction zone 13, through which the cooling air that has entered through the short wave zone 11 and/or the medium wave zone 12 is arranged to be drawn.

The first radiation zone, this zone being advantageously a short wave infrared radiation zone 11, comprises, in the case of the exemplary dryer, a radiator $T_1$, which most advantageously consists of short wave quartz tube radiators. The second radiation zone 12, this zone being advantageously a medium wave radiation zone, comprises a radiator $T_2$, which in the exemplary case of FIG. 3 consists of medium wave quartz tubes.

In the embodiment of the figure, the radiation units 14, advantageously short wave quartz tube radiators 15, have been arranged to form modules 14a,14b,etc. It is possible by placing such modules 14a,14b, . . . side by side to build up the desired dryer breadth. In the embodiment of the figure, each module 14a comprises four quartz tubes.

In the embodiment of the figure, the suction zone 13 is located after the short wave zone 11, as seen in the direction of travel K of the web E. In the embodiment of FIG. 3 the suction zone 13 has not been fitted with radiators.

In the embodiment of the figure, the medium wave zone 12 is located last, in the direction of travel K of the material web E. This second radiation zone 12 is most advantageously a medium wave radiation zone. It comprises said second radiator $T_2$, which most advantageously is a medium wave radiator and consists, in the embodiment of the figure, of medium wave quartz tubes 16. The tubes 16 are disposed on a rail 17. Fixing on the rail 17 may be with separate fixing elements, not depicted in the figure. Arrows in the figure indicate the path of the cooling air.

Figure 4:
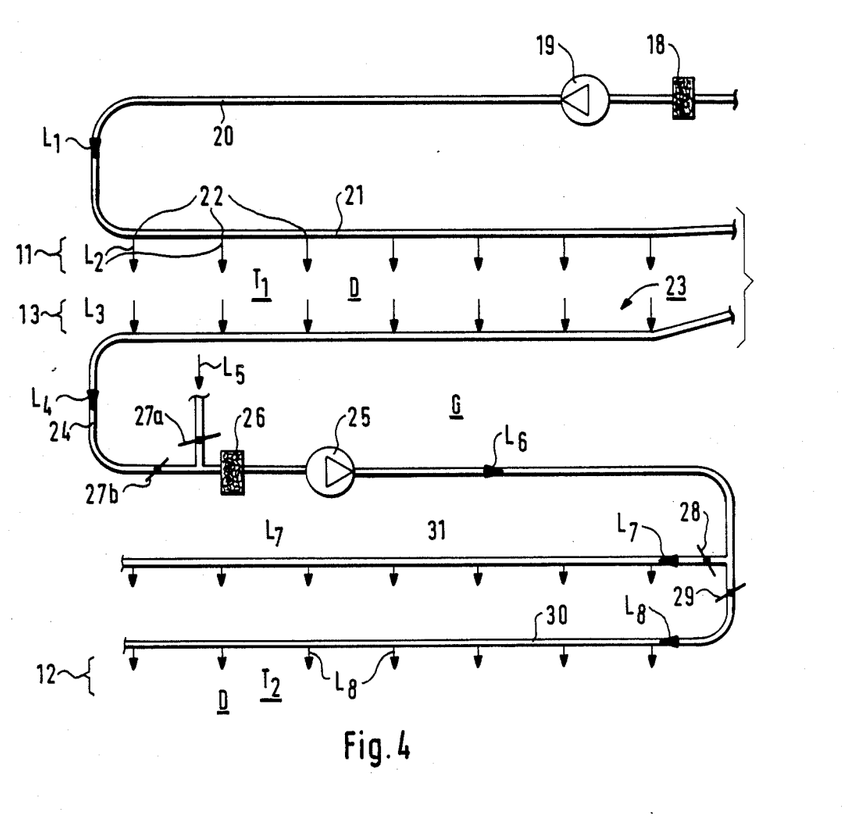
In FIG. 4 is presented an embodiment of the air-conditioning system in a dryer according to the invention, in schematical presentation.

In FIG. 4 is schematically shown the air-conditioning of the dryer of the invention. The cooling air for the shorter wave zone 11 is introduced through the filter 18 with the aid of a blower 19, by the air conditioning passage 20, into the rear part of the short wave zone 11. The air is thence blown in among the radiators $T_1$. The tubular connector by which the dryer 10 is connected to the air-conditioning pipe 20 has to be flexible in the case of a movable dryer 10. The path of the air to said short wave zone 11 is indicated with an arrow $L_1$. The air is uniformly distributed, as indicated by arrows $L_2$, over the zone 11 with the aid of a header 21 or equivalent provided behind the zone 11. When, as indicated by arrows $L_2$, the air meets the radiator $T_1$, which consists of a plurality of radiating tubes, the air carries heat from the surface of the tubes along with it. The tubes will be cooled and the air is warmed up. The cooling air is discharged onto the drying zone, which is indicated with D. The cooling air is discharged onto said drying zone D through particular passages 22 (not depicted in FIG. 4). The passages 22 have been so located and shaped that the air flow will predominantly pass towards the suction box 23 of the suction zone 13. Since by effect of the blown air the drying zone D will carry over-pressure relative to the surroundings, air leakage into the surroundings D cannot be avoided. If the suction is powerful enough, the air leakage may turn back from the surroundings G to the drying zone D.

The suction box 23 is connected on the intake side of the blower 25 or equivalent means producing air flow. The suction air is filtered in the filter 26, whereby the dust entrained with the suction air is eliminated. Quantity and temperature of the suction air are regulated with the aid of controls, advantageously with the aid of adjustable dampers 27a, 27b. On the delivery side of the blower 25 the air flow $L_6$ is divided into two flows with the aid of adjustable dampers 28 and 29. The cooling air is divided, in the embodiment of the figure, to go to the counter-reflector 37, through an air-dividing means, advantageously a divider header 31 associated with the counter-reflector 37 (arrow $L_7$).

The air conducted to the counter-reflector 37 cools the counter-reflector, and from this reflector the air may be further directed against the surface of the moving web material through a plurality of discharge apertures. These cooling air discharge apertures may most advantageously be located on the side of the counter-reflector facing the web material. The other of the two air flows $L_8$ is directed into the cooling air passage 30 of the medium wave zone 12. The cooling air that has been conducted into contact with the radiator $T_2$ warms up and discharges through between the radiators into the drying zone D. Owing to the over-pressure resulting from blowing, part of the air flow leaks out from the drying zone D.

In the drying zone D of the short wave zone, or the short wave region, the air temperature is 80° to 150° C. Depending on degree of air circulation, air leakage quantity and mixing air flow, the air temperature may be raised in the medium wave zone and the suction zone up to 450°-500° C.

Figure 5:
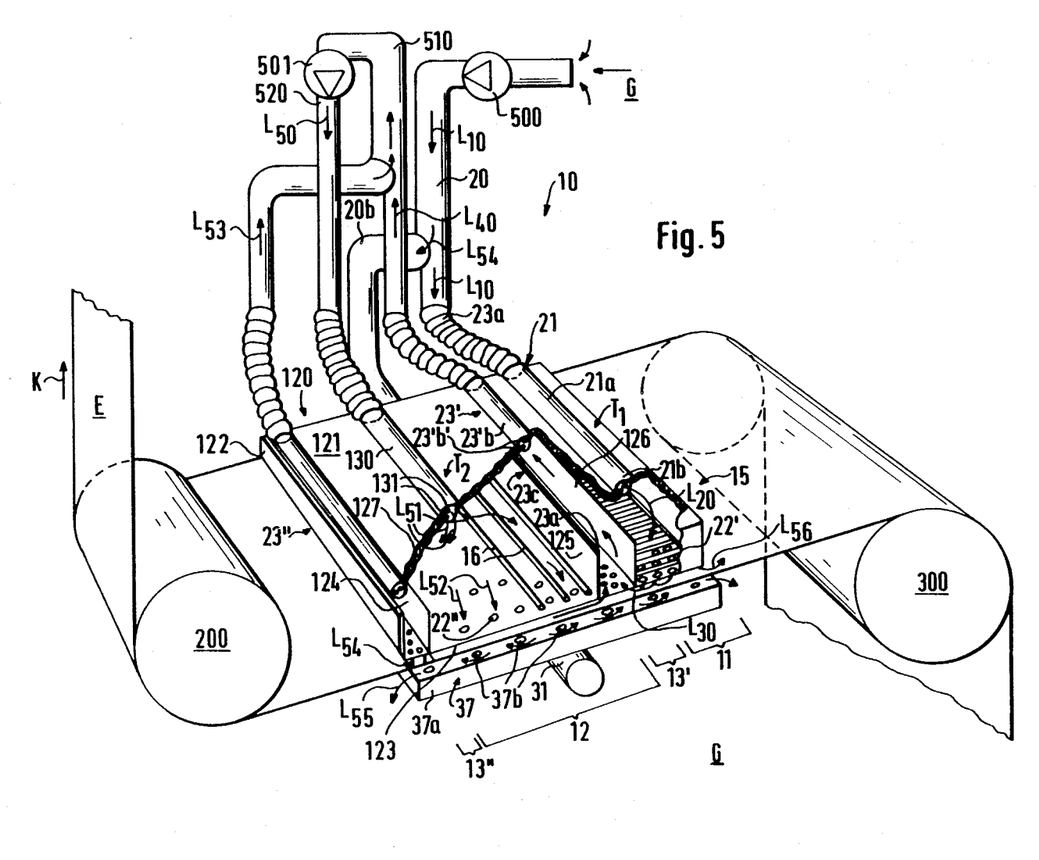
In FIG. 5 is presented, in axonometric perspective, an IR dryer according to the invention.

In FIG. 5 is presented another embodiment of the IR dryer of the invention, in axonometric perspective. The material to be dried is first introduced in the short wave zone 11, and thereafter the material goes through the suction zone 13' to the medium wave zone 12. As the web arrives in the dryer 10, it first meets the short wave zone 11, into which cooling air is supplied by a separate passage. The electricity to the radiators $T_1, T_2$ is supplied by a separate cable. The raw material is heated by effect of the high power per unit area of the short wave infra. The cooling air passes through the first radiator $T_1$ to the suction box, whence it goes either directly out of the dryer or to the second radiator $T_2$. On the other side of the material web a counter-reflector has been provided, on its rear surface being disposed the entrance chamber of the cooling air passage.

In the embodiment of FIG. 5 the moving web material E is conducted in the direction of arrow K over rolls 300,200. The IR dryer of the invention, 10, is disposed between the rolls 200,300, and the IR dryer 10 comprises a counter-reflector 37. In the embodiment of the figure, the IR dryer 10 comprises one first infrared radiator $T_1$ and one second infrared radiator $T_2$. Between said first infrared radiator $T_1$ and said second infrared radiator $T_2$ is located the first suction box 23'. The IR dryer depicted has furthermore a second suction box 23" on one margin of the infrared radiator $T_2$. The cooling air comes in the depicted embodiment of the invention, as indicated with arrow $L_{10}$, through the flexible section 20a of the cooling air passage 20 to the header 21 or equivalent, fitted on the frame of the IR dryer proper. The header 21 is a tubular component comprising a plurality of cooling air discharge apertures 21b on the mantle of the tube, through which the cooling air is uniformly distributed into conjunction with the radiation units 14, advantageously short wave quartz tube lamps 15, of the radiator $T_1$. The short wave quartz tube lamps 15 have been disposed adjacent to the side 123 towards the material web of the frame 120 of the IR dryer. This side 123 towards the material web furthermore comprises a plurality of cooling air discharge apertures 22', through which the cooling air can be conducted mainly towards the suction box 23, but also to the drying zone D, whereby the warming of the cooling air may be utilized in the material web drying process.

In the embodiment of the figure the air is distributed to the radiator $T_1$ as shown by arrow $L_{20}$, and the cooling air passes through the radiation units 14, advantageously short wave quartz tube lamps 15, to exit apertures 22', and the cooling air goes further, in its main part, to the suction box 23 through the apertures 23a. The suction box 23 is subjected to suction by a pump or by another means producing suction. The suction box comprises an air exhaust tube 23b disposed in connection with the suction box, this tube comprising a plurality of apertures 23b' on its mantle surface, through which the air that has been conducted into the central space 23c of the suction box passes onward and out of the IR dryer. In the embodiment of FIG. 5 the cooling air is carried to the second radiator $T_2$ as indicated by arrow $L_{50}$, and the cooling air is distributed through distribution apertures 131 on the surface of the header 130, as shown by arrow $L_{51}$, into conjunction with the radiation units, advantageously medium wave quartz tube lamps 16, of the radiator $T_2$. Said quartz tube lamps 16 have been disposed to be adjacent to the underside 123 of the IR dryer so that, after passing by the quartz tube lamps, the air goes further through the apertures 22" to the drying zone D and into conjunction with the web material to be dried, and/or directly to the first suction box 23' and/or the second suction box 23".

From said second suction box 23" the air goes in fully similar way through similar action means as in the case of the first suction box, as shown by arrow $L_{53}$, out from the IR dryer. In the embodiment of the figure cooling air is also carried from the flow passage 20 through a branching point and along a passage 20b, as indicated by arrow $L_{54}$, to the counter-reflector 37, which has been disposed to be located on the opposite side of the material web E from the radiators $T_1, T_2$. The air of the counter-reflector 37 is distributed through the header 31 or equivalent. The counter-reflector 37 is a box-like structure comprising on its side towards the material web a plurality of air discharge apertures 37b, through which the air can be uniformly distributed over the surface of the moving material, whereby the cooling air of the counter-reflector 37 may be usefully applied.

As taught by the invention, the IR dryer may comprise a pump 500 which has been disposed to draw air through a filter (not depicted) from machine hall air into the passage 20. The IR dryer 10 may likewise comprise a pump 501, which is on its intake side connected to a passage 510 and on the delivery side to a passage 520. In this manner said air is continuously circulated in the apparatus. As shown in the diagram, the IR dryer is disposed with its levels in horizontal arrangement, but the radiation zones of the IR dryer may equally be vertically disposed.

In the embodiment of the figure, the air that has discharged from the counter-reflector 37 onto the surface of the web material goes, as indicated by arrow $L_{55}$, out from the IR dryer, and said air that has exited may be taken, by suction means or equivalent not depicted, further into the cooling circulation. Similarly, on the other side of the material web, the pressurized air goes partly to ambience as indicated by arrow $L_{56}$. However, if the suction of suction boxes 23' and 23" is sufficient, part of the cooling air that has gone to ambience G can be caught back into the air circulation ($L_{54}$). In the embodiment of FIG. 5, the IR dryer comprises a frame 121 and a bottom plate of a material well permeable to radiation, this being the plate 123 facing towards the material web. The plate 123 may consist e.g. of glass and it may have e.g. holes for air passage apertures. The plate 123 may also be formed so that it comprises longitudinal metal strips in which holes have been provided for passage of air, and in that case a plate well transparent to infrared radiation, e.g. a glass sheet, has been placed between the metal sheets proper. The frame structure furthermore comprises side plates 122 which encircle the structure on all sides. The plate 123 comprises the air passage apertures 22',23a, 22", etc. already mentioned. The structure has been made to consist of sections so that the structure comprises the partitions 124,125 and 126 in the interior space of its box, which divide the structure into radiator sections $T_1,T_2$ and suction box sections 23' and 23".

It is clear that the structure may however be formed in a variety of ways within the scope thereof. In the embodiment of FIG. 5, the moving web material first meets the first radiation zone, this being advantageously a short wave radiation zone. Next, the web material encounters the first suction zone 13' and, thereafter, the second radiation zone 12, this being advantageously a medium wave radiation zone. Ultimately the web material moves into the region of the second suction zone 13" before leaving the IR dryer. In the embodiment of FIG. 5, the IR dryer 10 includes thermal lagging 127, which has been applied on all mantle surfaces of the frame 120 except that on the side of the material web.

Figure 6:
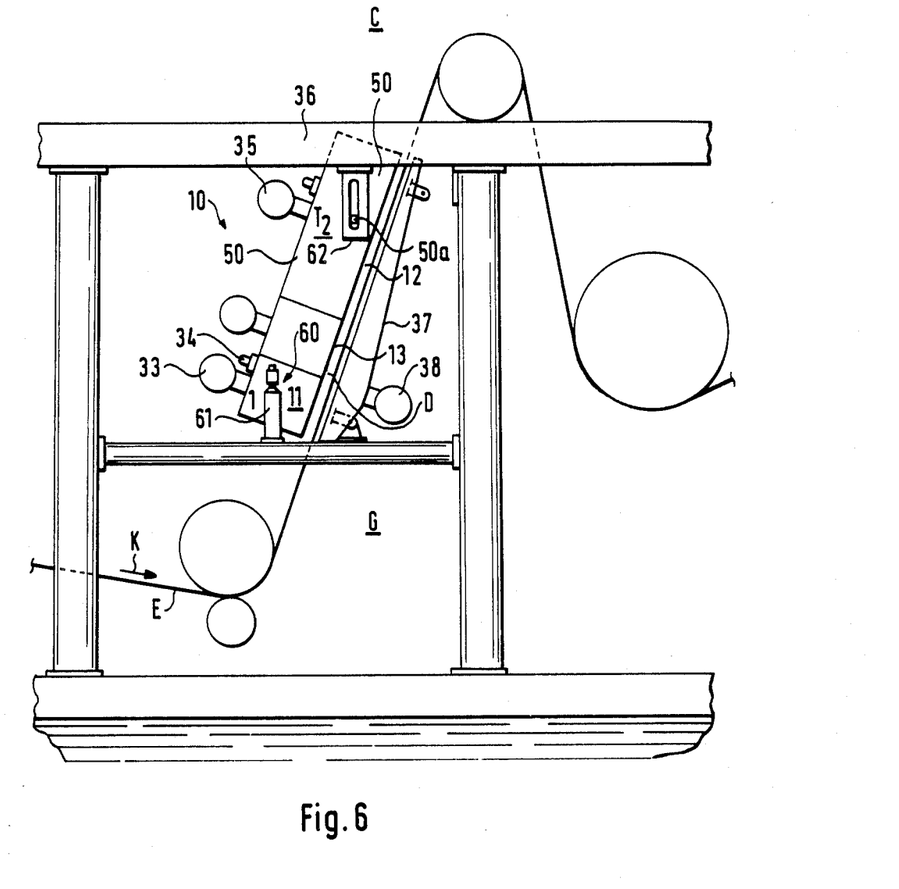
FIG. 6 presents the placement of the dryer of the invention in a paper machine.

In FIG. 6 is presented an embodiment in which an IR dryer according to the invention has been fitted on a paper machine. The paper web 40 moves in the coating station of the paper machine through a roll arrangement as shown. When the web arrives at the drying zone D, its temperature is usually about 56°–60° C. On arrival at the drying zone the web first encounters the short wave zone 11, to which cooling air is supplied by the passage 33. Electricity is supplied to the infra radiators by the cable 34. The web is heated, owing to the high power per unit area of the short wave infra, to about 70° C., and this also starts evaporation.

Although the temperature of the radiator $T_1$ is very high, the web temperature hardly rises above 70° C. because the evaporating water forms on the web surface a boundary layer which has the same temperature as the paper surface and humidity equalling the humidity of saturated air at the temperature of the surface. Owing to this phenomenon, evaporation continues as the web enters the suction zone, but due to the absence of any radiation source the temperature in the web goes slightly down. No such temperature drop occurs if for instance medium wave radiators are placed in the suction zone.

As the web travels further on in the dryer, it arrives at the medium wave zone 12, to which cooling air is supplied by the passage 35. Electricity is carried to the radiator $T_2$ by the cable 36. The temperature of the web rises again to evaporation temperature, and evaporation continues.

As taught by the invention, the power per unit are in the short wave zone 11 and in the medium wave zone 12 may be so regulated that the harmful phenomenon occurring while the coating is being dried, the so-called bonding agent migration, comes under control. This is implemented in that in the dryer in the short wave zone the coating compound reaches its gelification point, whereby the migration of bonding agent in the base paper and in the compound is arrested. In the embodiment of the invention depicted in FIG. 6 the IR dryer 10 of the invention has been provided with a cooled counter-reflector 37. To this reflector cooling air is carried by the passage 38. Cooling the counter-surface is particularly necessary when using a short wave radiator. This is because the radiation that has traversed the web causes powerful heating of the counter-reflector. Cooling of the counter-surface with an air flow also improves the runability of paper in the IR dryer. In one embodiment of the invention, not depicted here, the counter-reflector is provided with a suction box, whereby the air leaking off from the drying zone on the counter-reflector side can be recovered. An IR dryer according to the invention may be placed after the coating station of the paper machine to dry the coating compound which has been applied in the coating process on the surface of the base paper. The frame 50 of the radiator and the counter-reflector 37 may be supported on the frame of the process equipment. For web end conduction, trouble-shooting and maintenance the means 10 is provided with a moving mechanism 60. The hydraulic cylinder 61 pushes the IR dryer upwards along its frame 50, guided by guides 62 or equivalent provided on the frame 50 of the process apparatus, the pin 50a on the drier frame 50 being held in a slot or equivalent of the guides 62. This enables the means 10 to be pushed farther away from the drying zone for trouble-shooting or maintenance.

Figure 7A:
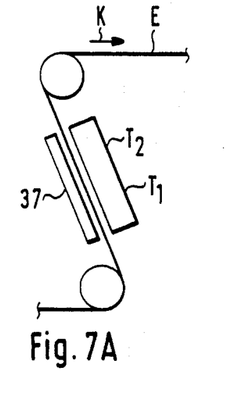
In FIG. 7A is presented an embodiment of the invention in which behind the web material, opposing the radiator, has been placed a counter-reflector, the radiator and the counter-reflector being located on different sides of the web material.
Figure 7B:
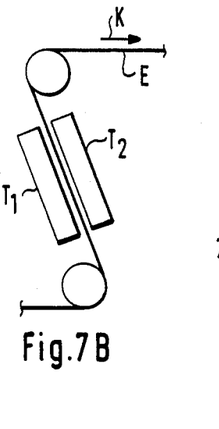
In FIG. 7B is presented an embodiment of the invention in which the IR dryer consists of two radiator units which are located opposing each other, on different sides of the web material.
Figure 7C:
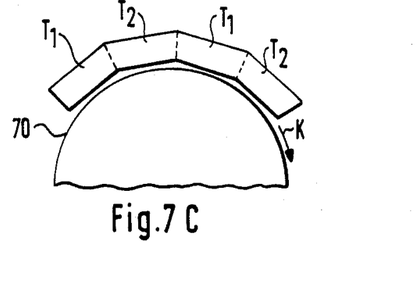
In FIG. 7C is presented an embodiment of the invention in which the IR dryer consists of radiators disposed to follow the mantle surface of a drying cylinder.

In FIGS. 7A–C are shown various ways of positioning the radiators in relation to the material web. In FIG. 7A is depicted an embodiment in which the radiators $T_1$ and $T_2$ have been disposed both on one side of the material web. The counter-reflector 37 has been disposed on the side of the material web E opposite to the radiators. The counter-reflector has been disposed to reflect the radiation that has passed through the web, back into the material web E. The counter-reflector 37 is particularly needed in the case of short wave radiators because short wave radiation passes through the material web more readily than long wave radiation.

In FIG. 7B is depicted an embodiment of the invention in which radiators have been disposed on both sides of the material web. In the embodiment of FIG. 7B, on one side of the material web has been disposed an infrared radiator $T_1$ and on the other side an infrared radiator $T_2$. It is possible by this arrangement to increase considerably the drying power directed on the material surface.

In FIG. 7C is depicted an embodiment of the invention in which the radiators $T_1,T_2$ have been placed to follow the surface of the drying cylinder 70. The drying cylinder 70 may be steam-heated.

Figure 8A:
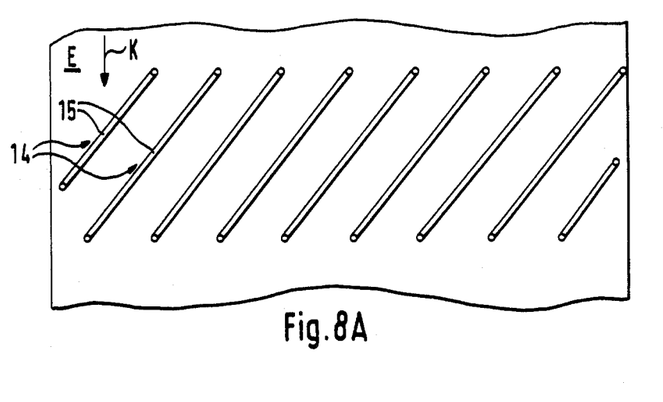
In FIG. 8A is presented the composing of the radiator of rod-shaped elongated radiation emitters, advantageously rod tubes, which have been disposed obliquely in relation to the direction of travel of the web material.
Figure 8B:
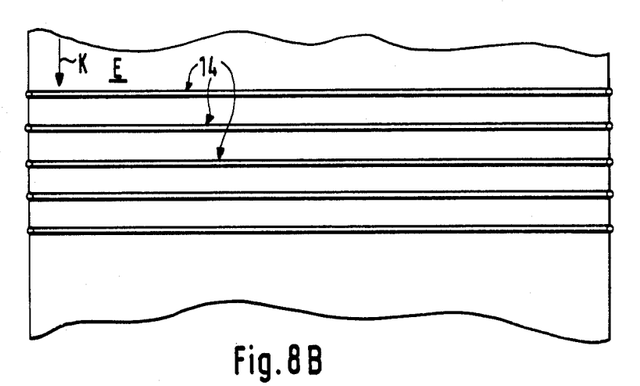
In FIG. 8B is presented an embodiment of the invention in which the rod-shaped radiator components have been disposed transversally to the direction of travel of the web.

In FIGS. 8A and 8B the structure of the radiator $T_1$ and/or $T_2$ is presented. The radiators consist of elongated radiation units 14, e.g. of quartz tubes 15,16. The tubes have in the embodiment of FIG. 8A been placed with their central axis at an angle against the direction of travel K of the paper web E, for instance. By this oblique positioning according to the invention, uniform radiant flux directed on surface of the material to be dried is achieved. Control of the radiator may be advantageously implemented in this embodiment in that every second radiator is switchable off. In this way the radiant power is controllable, while the radiation flux incident on the paper surface is continuous all the same. This factor is particularly significant when uniform drying quality is aimed at. The moisture profile of the web should be as constant as possible in the direction across the web, and therefore maximally uniform impingement of radiation on the material web is required.

In those special cases, too, in which the material web contains different areas from the viewpoint of drying requirements, desired radiant power, and radiation flux such as may be desired, can be achieved by positioning the radiation units as taught by the invention. It is fully conceivable, of course, that higher drying power is desired at a given point of the material web, and it is thus possible according to the present invention to direct a higher radiation quantity on such areas.

In FIG. 8B is depicted the placing of elongated radiation units 14 with their central axes transverse to the direction of travel K of the web. Once again, the radiation units 14 may consist of elongated tubular elements, e.g. of quartz tube radiators 15,16, and control is feasible by providing a separate starter for each radiation unit.

Figure 9A:
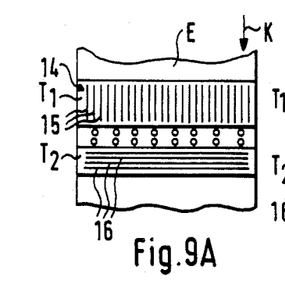
In FIG. 9A is presented a conceivable orientation in relation to each other and to the direction of travel of the web, of radiation emitting units operating in two different wavelength ranges, advantageously a short wave radiator $T_1$ and a medium wave radiator $T_2$.
Figure 9B:
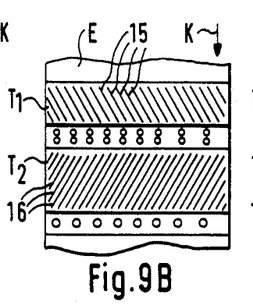
In FIG. 9B is presented another embodiment of the invention in which the radiation emitters of the radiators are placed in a position in relation to the direction of travel of the web differing from that in FIG. 9A.
Figure 9C:
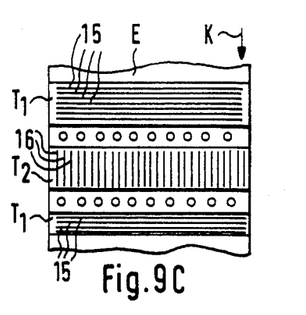
In FIG. 9C is presented a third embodiment of a radiator disposition in which the IR dryer has been composed of a plurality of radiators $T_1$ and $T_2$ placed alternatingly in relation to the direction of travel of the web.

In FIGS. 9A-9C is depicted the positioning of radiation units, e.g. of quartz tubes, in different directions in each radiator $T_1$ and $T_2$. In the embodiment of FIG. 9A the quarts tubes 15 of the short wave radiator $T_1$ have been placed with their longitudinal axes parallelling the direction of travel K of the web E. The radiation units of the medium wave radiator $T_2$, advantageously medium wave quartz tubes 16, have in the embodiment of FIG. 9A been placed transversally to the direction of travel K of the web.

In FIGS. 9A-9C, the suction zone or suction boxes between the radiators are depicted, with no reference numerals indicated.

In the embodiment of FIG. 9B the quartz tubes 15 of the radiator $T_1$ have been placed obliquely in relation to the direction of travel K of the web, and similarly the radiator units of the medium wave radiator $T_2$, advantageously medium wave quartz tubes 16, have also been disposed obliquely to the direction of travel K of the web, however so that the directions of the central axes of the quartz tubes or other radiation element configurations made in elongated shape of each radiator $T_1$ and $T_2$ are at an angle against each other.

In the embodiment of the invention depicted in FIG. 9C, the IR dryer consists of a plurality of radiators $T_1,T_2$. Said radiators $T_1,T_2$ have been alternatingly positioned in relation to the direction of travel K of the web. The radiation units of the medium wave radiators $T_2$, advantageously medium wave quartz tubes 15, have been placed with their longitudinal axes at right angles to the direction of travel of the web, and the radiation units of the short wave radiators $T_1$, advantageously short wave quartz tubes, have been placed with their longitudinal axes parallelling the direction of travel of the web. In the embodiment of FIG. 9C are depicted two short wave radiators $T_1$ and only one medium wave radiator $T_2$, but it is clear that there may be a number of radiators $T_2$ as well as radiators $T_1$.

Figure 10:
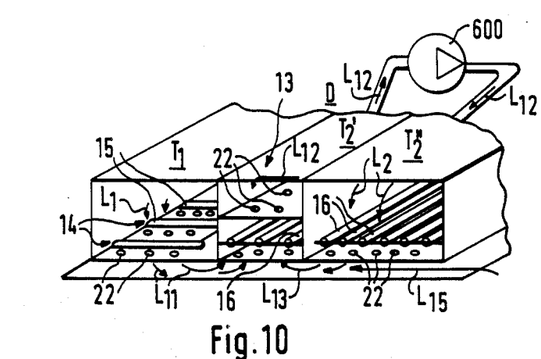
In FIG. 10 is presented, in axonometric perspective, an embodiment of the disposition of the radiators in relation to the ventilation air passage system.

In FIG. 10 is presented an embodiment of the invention in which the suction zone 13 has been disposed upon the radiator $T_2'$. In this embodiment the cooling air $L_{10}$ is first carried to the radiation elements, advantageously short wave quartz tubes 15, of the first radiator $T_1$. The cooling air takes up heat from the surfaces of the quartz tubes and is warmed and goes, as indicated in the embodiment of FIG. 10 with arrow $L_{11}$, to the radiation units of the second radiator $T_2$, advantageously a medium wave radiator, and takes up further heat from them, is heated further and goes thereafter to the drying zone D (arrow $L_{12}$). From the drying zone D the cooling air goes (arrow $L_{12}$) directly to the third radiator $T_2''$, which advantageously is also of type $T_2$, i.e., advantageously also a medium wave radiator. From here, part of the cooling air may go, drawn by a suction means, out from the IR dryer 10. The suction zone 13 may however operate further also in the way that part of the leakage air which has already exited from the dryer 10 is drawn back into the IR dryer as indicated by arrow $L_{15}$. In this embodiment a flow passage has been provided between the radiators $T_2'$ and $T_2''$ so that at least part of the cooling air which has gone from radiator $T_2'$ to radiator $T_2''$ is carried back to the radiator $T_2'$. This recycling circulation is indicated by arrow $L_{13}$ in FIG. 10. From the pump means a suction passage may be carried either to a suction box disposed above the radiator $T_2'$, or said suction passage may be arranged in conjunction with the radiator $T_2''$.

As shown in the figure, air may be circulated by the aid of a pump means 600 or equivalent between radiator $T_2'$ and radiator $T_2''$, the suction box being located above the radiator $T_2''$.

Figure 11:
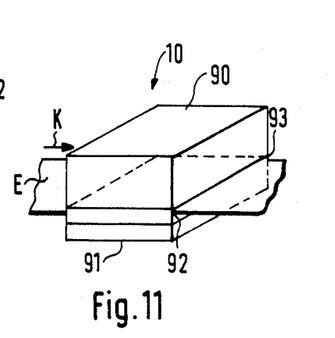
In FIG. 11 is presented an embodiment of the invention in which the IR dryer comprises glare guards.

In FIG. 11 is presented in axonometric perspective the use of a glare guard between the radiator component 90 and the counter-reflector component 91. The IR dryer 10 has on its sides been provided with glare guards 92 and 93. A glare guard may equally be used on all marginal areas of the radiator component proper and also, when a counter-reflector is used, on all marginal areas of the counter-reflector, not only adjacent to the lateral margins of the material web. The secondary task of the glare guard is to prevent air leakage from and into the apparatus. The main task of the glare guard is to prevent damage to the retina of the human eye caused by the bright radiation.

Figure 12A:
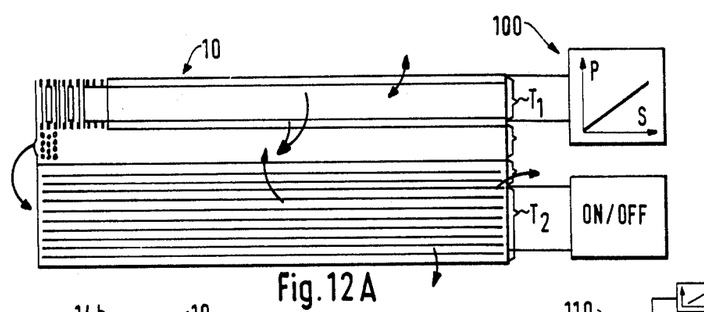
In FIG. 12A is presented a power control for the IR dryer of the invention, in schematic presentation.
Figure 12B:
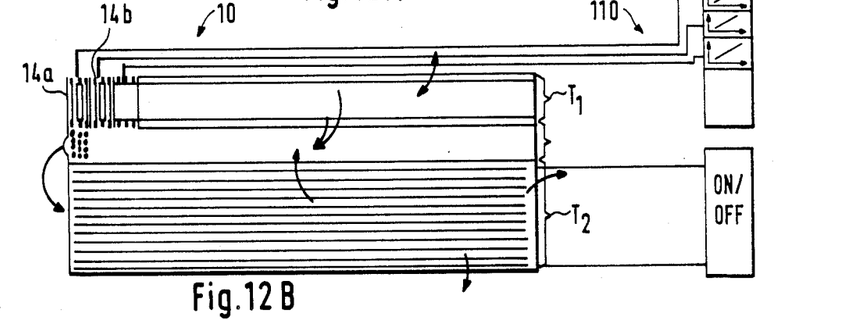
FIG. 12B is another embodiment of the power control, likewise in schematic presentation.

In FIGS. 12A and 12B are presented a few embodiments of the control of the IR dryer of the invention. In FIG. 12A is shown control of the IR dryer 10 in the manner that the first radiator $T_1$, this being advantageously a short wave radiator, is steplessly controlled, whereas the second radiator $T_2$ is merely switched on/off. The presentation is schematical in FIG. 12A, and the figure illustrates the controllability of radiant power with the control (S) being arranged to regulate the power output (P) steplessly from zero to the maximum output of the radiator. In contrast, control of the radiator $T_2$ is effected merely according to the on/off principle, that is by switching this radiator either on or off.

It is thus understood that the power of the short wave radiator can be steplessly regulated. This enables cooling and warming up of the short wave radiators to take place in a few seconds. Thus, stepless power control of the whole IR dryer is achieved within an adequate range of control.

In FIG. 12B is presented a control embodiment of the invention in which the short wave infrared radiators in the radiator $T_1$ have been grouped in modules $14a,14b$, ..., each module comprising one or several separate radiator units 14, advantageously short wave quartz tubes. Each module is steplessly controllable. In this way the desired radiation profile in the breadth direction of the web is obtained, according to drying needs in each instance. In this embodiment one of the radiators, $T_2$, is still controllable in on/off fashion. Power control of the whole IR dryer 10 thus takes place, in this control embodiment too, steplessly within an adequate control range. A particular advantage of the control both in the embodiment of FIG. 12A and in that of FIG. 12B can be seen in the circumstance that an expensive stepless radiant power control is provided for one radiator $T_1$ only, while no power control is applied in the case of the other radiator $T_2$, which merely either produces its maximum output or is completely switched off. This implies savings in instrumentation costs and affords an IR dryer which is advantageous as regards its design and is still steplessly controllable as a whole. In the embodiment of FIG. 12B furthermore a steplessly controllable IR dryer according to the invention is obtained in which said stepless control feature is almost linearly applicable in the direction across the web, whereby a radiation flux profile as desired is achieved in the transversal direction of the web.

In the embodiment of FIG. 12B the modules of the radiator $T_1$ composed of radiator units, advantageously of short wave quartz tubes, may be controlled in zones with the aid of a thyristor bridge or another equivalent control means.

Such an embodiment ia also feasible in which the second radiator $T_2$ is steplessly controlled.

In the embodiments of FIGS. 12A and 12B, cooling air is conducted to the radiators. With the radiator temperature control just described, the cooling air is also controlled, and thereby that air which goes from the radiators to the drying process in the drying zone D. When a counter-reflector is used in connection with the radiators and when in connection with the counter-reflector cooling of the counter-reflector is applied, endeavours are made to shape the cooling air discharge apertures from the counter-reflector in a manner such that the air leakage from the counter-reflector to ambience will be minimized and the travel of the web in the drying zone is stabilized. The flowing of said cooling air of the counter-reflector may be controlled with the aid of separate control dampers or equivalent. The counter-reflector in the above embodiments, as well as that in any one of the earlier embodiments, may be provided with a separate suction system by means of which the air can be circulated.

The temperature of the cooling air going into the drying zone may, in addition, also be controlled with a control means, e.g. a control damper, installed in the cooling air duct system, or using a by-pass passage, in which case part of the blown air is conducted past the radiators and readmixed in a mixing zone to the air going to the drying zone and to the air fraction coming from the radiators.

Figure 13A:
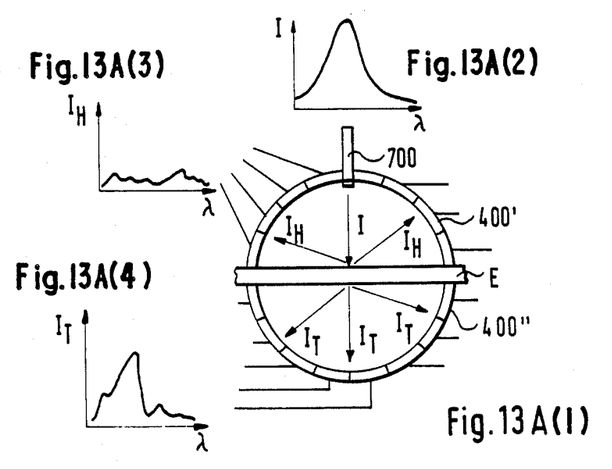
In FIG. 13A is presented an experimental set-up according to the invention for determining the absorption spectrum. The projection is an elevational view of the apparatus.

In FIG. 13A is illustrated that step in the procedure of the invention in which the absorption spectrum of the web material is measured. On either side of the web material, detectors 400′,400″ have been disposed. The detectors are placed on the circumference of a circle and a radiation source 700 has been disposed to emit radiation towards the web material E arranged to be located on the diameter of said circle. Part of the radiation, $I_A$, is absorbed in the web material. Part of the radiation fails to pass through the web material and is instead reflected and scattered by the surface of the web material. This reflected and scattered fraction is denoted with $I_H$. A part $I_T$ of the radiation passes through thr web material and is scattered into the space behind the web material. The scattered and reflected radiation meets the detectors 400′,400″, which measure its intensities $I_H(\lambda)$ and $I_T(\lambda)$. The test radiator 700 producing the radiation produces a given emission spectrum. Various filters are employed to produce radiation having desired wavelength and test wavelength, and the absorption of said radiation in the material is measures.

Figure 13B:
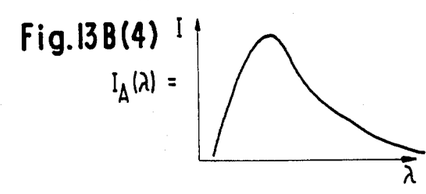
In FIG. 13B is schematically presented the determination of the absorption spectrum of a material in the testing means of the invention.

In FIG. 13B is presented the method just described, on the horizontal axis being plotted the wavelength of the radiation from the radiator and on the vertical axis, the radiation intensity. The emission spectrum of the radiator is with the aid of filters subdivided into band pass zones and each zone is directed on the web material step by step, by changing filters. This enables the absorption spectrum to be found as a function of wavelength for different materials, that is, the spectrum indicates in which wavelength range and/or ranges the material absorbs radiations with highest efficiency.

As taught by the invention, the radiation units of the radiators $T_1,T_2$ of the IR dryer 10 are now selected so that the overall spectrum of the radiation intensity in the IR dryer is maximally consistent with the absorption spectrum of the web material to be dried. This optimation implies that selection of the radiation units for the radiators $T_1,T_2$, etc. of the IR dryer is carried out so that the emission spectrum of at least one radiator $(T_n)$ corresponds to the absorption spectrum of the web material to be dried, as regards its maximum. The maximum intensity of the spectrum of the total radiation may lie in another wavelength range from the maximum absorption of the web material. Optimation is moreover carried out so that the requirements imposed on the web material to be dried are met, such as evaporation requirements, temperature requirements, etc.

The measuring process is described more closely in the following. The test measurement process is schematically illustrated by FIG. 13. The radiator 700 emits a spectrum $I(\lambda)$, which is with band pass filters subdivided into narrow wavelength ranges. In each band pass range, the intensity $(I_H(\lambda))$ of the radiation reflected and scattered into half-space above the sample is measured with the detectors 400′. The intensity $I_T(\lambda)$ of the radiation that has passed through and been scattered is similarly measured in the half-space under the sample.

In the manner presented in FIG. 13, the absorption spectrum $I_A(\lambda)$ can be determined with the aid of the spectra $I(\lambda)$, $I_H(\lambda)$ and $I_T(\lambda)$ as follows:

$$I_A(\lambda) = I(\lambda) - I_H(\lambda) - I_T(\lambda)$$

The calculation routine has been schematically illustrated with the aid of diagrams in FIG. 13.

Figure 13C:
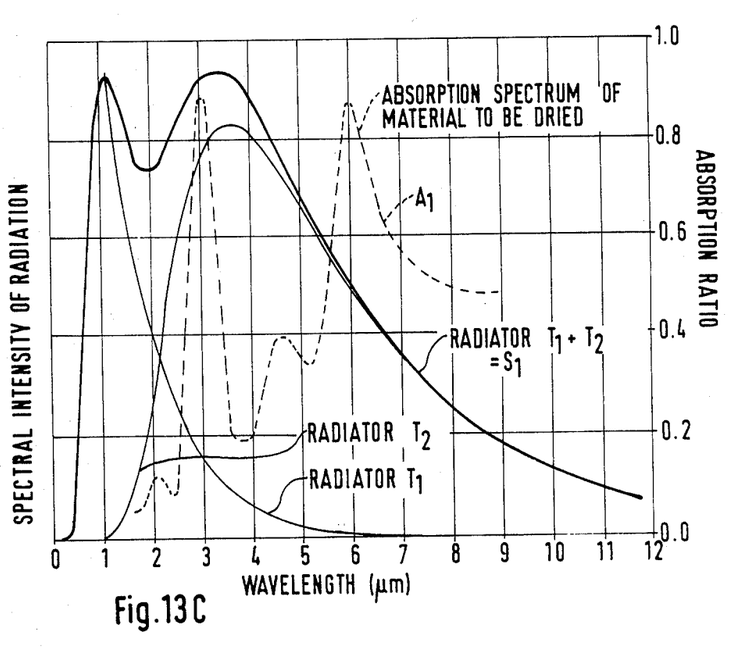
In FIG. 13C is presented the total spectrum of the IR dryer, obtained as result of selection of radiation units for the radiators carried out with optimizing as taught by the invention.

In FIG. 13C is presented an IR dryer implemented with optimization and radiator selection as taught by the invention, wherein the radiators $T_1$ and $T_2$ have been so selected that the total emission spectrum thereby formed is substantially consistent, regarding one of its maxima, with the absorption maximum of the web material to be dried. The symbol $S_1$ indicates the total spectrum of the IR dryer and $T_1$ and $T_2$ indicate the individual spectra of the radiators, and the absorption ratio spectrum of the web material to be dried has been plotted in the same diagram, being indicated by $A_1$.

I claim:

1. A procedure for drying a moving web material (E), wherein infrared radiation is directed on the material (E) to be dried, and the moving web material is transported through a radiation zone of an infrared radiator, the web material to be dried absorbing radiation, and wherein on the moving web material to be dried, the radiation produced by at least one first infrared radiator $(T_1)$ and the radiation produced by at least one second infrared radiator (T$_2$) are directed, said radiators being disposed close to each other, a maximum intensity wavelength ($\lambda_{maximum}$) (T$_1$) of the radiation from said first infrared radiator (T$_1$) being smaller than maximum intensity wavelenth ($\lambda_{maximum}$) (T$_2$) of the radiation from said second radiator (T$_2$), whereby in the drying, a spectrum of total radiation is maximized in relation to absorption spectrum of the material to dried.

2. Procedure according to claim 1, wherein the maximum intensity of the radiation produced by said first infrared radiator (T$_1$) is substantially higher than that of said second infrared radiator (T$_2$).

3. Procedure according to claim 1, wherein said first radiator (T$_1$) is a short wave infrared radiator and said second radiator (T$_2$) is a medium wave infrared radiator, the maximum intensity of the radiation from the first infrared radiator (T$_1$) that is used lying within the wavelength range 0.76 $\mu m < \lambda_{max} < 2.00$ $\lambda m$ and the maximum intensity of the radiation of said second radiator (T$_2$) lying within the wavelength range 2.00 $\mu m < \lambda_{max} < 4.00$ $\mu m$.

4. Procedure according to claim 1, wherein the radiators (T$_1$,T$_2$) are so optimized that the total spectrum of the radiation of the IR dryer formed by an radiators is made to conform as well as possible to the absorption spectrum of the web material to be dried, and so that the maximum in an emission spectrum of at least one radiator (T$_n$) corresponds to one absorption maximum of the web material to be dried.

5. Procedure according to claim 4, wherein selection of radiators (T$_1$,T$_2$) computer calculation is employed, and a basis used for calculative optimization being the absorption spectrum found for each web material from test measurement.

6. Procedure according to claim 1, wherein the first radiator (T$_1$) is disposed to be first in a direction of travel (K) of the web material (E) and said second radiator (T$_2$) is disposed to be located after the first radiator (T$_1$) in a direction of travel (K) of the web material (E).

7. Procedure according to claim 1, wherein for said first radiator (T$_1$) short wave quartz tube lamps (15) are used, and for said second radiator (T$_2$), medium wave quartz tube lamps (16) are used, the radiation being arranged to go directly or through separate intermedicate elements to the drying zone (D).

8. A procedure for drying a moving web material (E), wherein infrared radiation is directed on the material to be dried, and the moving web material is transported through a radiation zone of an infrared radiator, the web material to be dried absorbing radiation.

wherein on the moving web material to be dried, the radiation produced by at least one first infrared radiator (T$_1$) and the radiation produced by at least one second infrared radiator (T$_2$) are directed.

said radiators being disposed close to each other, a maximum intensity wavelength ($\lambda_{maximum}$) (T$_1$) of the radiation from said first infrared radiator (T$_1$) being smaller than maximum intensity wavelength ($\lambda_{maximum}$) (T$_2$) of the radiation from said second radiator (T$_2$).

whereby in the drying, a spectrum of total radiation is maximized, in relation to absorption spectrum of the material to be dried, and wherein, as said first radiator (T$_1$), a radiator is used which has been disposed on different sides of the web material to be dried (E) from the second radiator (T$_2$) and so that the first radiator (T$_1$) is located, regarding its radiation zone, substantially in opposition to the radiation zone of the second radiator (T$_2$), whereby the radiant power directed on the web material can be substantially increased.

9. Procedure according to claim 1, wherein a plurality of first radiators (T$_1$) and a plurality of second radiators (T$_2$) are used which have been disposed in alternate relation to each other in one and the same infrared radiation dryer (10).

10. An infrared radiation dryer (10) for drying moving web material (E), said infrared radiation dryer (10) comprising an infrared radiator which has been disposed to direct infrared radiation on the moving web material, wherein the infrared radiation dryer (10) comprises at least one first infrared radiator (T$_1$) and at least one second infrared radiator (T$_2$) which have been disposed close to each other, and maximum intensity wavelength ($\lambda_{maximum}$)(T$_1$) of said first infrared radiator (T$_1$) being smaller than intensity wavelength ($\lambda_{maximum}$)(T$_2$) of said second infrared radiator.

11. Infrared radiation dryer according to claim 10, wherein the maximum intensity of the radiation of the first infrared radiator (T$_1$) is substantially higher than the maximum intensity of the radiation of said second infrared radiator (T$_2$).

12. Infrared radiation dryer according to claim 10 wherein the first infrared radiator (T$_1$) is a short wave infrared radiator and the second infrared radiator (T$_2$) is a medium wave infrared radiator, the maximum intensity of the radiant output of said first infrared radiator (T$_1$) lying on the radiation wavelength range 0.76 $\mu m < \lambda_{max} < 2.00$ $\mu m$ and the maximum intensity of the radiant output of said second infrared radiator lying in the wavelength range 2.00 $\mu m < \lambda_{max} < 4.00$ $\mu m$.

13. Infrared radiation dryer according to claim 10 wherein in the dryer the first infrared radiator (T$_1$) is disposed before the second infrared radiator (T$_2$) as seen in a direction of travel (K) of the web material to be dried.

14. Infrared radiation dryer according to claim 10 wherein the frame structure of the infrared radiation dryer (10) comprises thermal lagging and fire insulation (127).

15. Infrared radiation dryer according to claim 10 wherein the infrared radiation dryer (10) comprises a flow passage or passages for warmed air, and through which cooling air coming from the first infrared radiator (T$_1$) and which has been warmed up goes to the second infrared radiator (T$_2$).

16. An infrared radiation dryer (10) for drying moving web material (E), said infrared radiation dryer (10) comprising an infrared radiator which has been disposed to direct infrared radiation on the moving web material.

wherein the infrared radiation dryer (10) comprises at least one first infrared radiator (T$_1$) and at least one second infrared radiator (T$_2$) which have been disposed close to each other, and maximum intensity wavelength ($\lambda_{maximum}$) (T$_1$) of said first infrared radiator (T$_1$) being smaller than maximum intensity wavelength ($_{maximum}$) (T$_2$) of said second infrared radiator, wherein the infrared radiation dryer (10) comprises radiation units in said two radiators, said radiation units (14) in the first infrared radiator (T$_1$) arranged with different orientation of central axes with reference to a direction of travel (K) of the web (E) and in a position different from that of the radiation units of the second infrared radiator (T$_2$).

17. The method of claim 7, wherein said separate, intermediate elements are thermal bricks.

18. The dryer of claim 16, wherein said radiation units of said first radiator are short wave radiation tubes (15), and said radiation units of said second radiator are medium wave radiation tubes (16).

* * * * *